United States Patent
Rabascall et al.

(10) Patent No.: US 6,426,036 B1
(45) Date of Patent: Jul. 30, 2002

(54) DIRECT REDUCTION DEVICE TO OBTAIN METAL IRON WITH A HIGH CONTENT OF CARBON IN THE FORM OF CARBIDE

(75) Inventors: David Rabascall; Henry Rafael Bueno, both of Puerto Ordaz (VE); Alessandro Martinis, Udine (IT)

(73) Assignee: Danieli & C. Officine Meccaniche, Buttrio (IT)

( * ) Notice: Subject to any disclaimer, the term of this patent is extended or adjusted under 35 U.S.C. 154(b) by 16 days.

(21) Appl. No.: 09/679,885

(22) Filed: Oct. 5, 2000

(30) Foreign Application Priority Data

Oct. 11, 1999 (IT) .......................... UD99A0185

(51) Int. Cl.⁷ ................................. C21B 7/16
(52) U.S. Cl. ........................ 266/176; 266/197
(58) Field of Search ................. 266/197, 176; 75/495

(56) References Cited

U.S. PATENT DOCUMENTS

| 2,862,808 A | 12/1958 | De Jahn ................ 75/495 |
| 3,479,232 A | 11/1969 | Broussard |
| 4,001,010 A | 1/1977 | Kanbara et al. ............. 75/495 |
| 4,070,180 A | 1/1978 | Waslo |
| 5,387,274 A | 2/1995 | Dam et al. ................... 75/495 |

FOREIGN PATENT DOCUMENTS

| DE | 19838368 | | 8/1999 | |
| WO | WO 00/49184 | * | 8/2000 | ................ 266/176 |

* cited by examiner

*Primary Examiner*—Scott Kastler
(74) *Attorney, Agent, or Firm*—Stevens, Davis, Miller & Mosher, LLP

(57) ABSTRACT

A direct reduction device (10) of the gravitational type to obtain iron carbide starting from iron oxide, comprising a reduction and carburation reactor (12) below which a cooling and passivation container (26) is arranged wherein the iron carbide is suitable to be cooled and passivated, between the reactor (12) and the container (26) a valve for solids (24) is interposed suitable to regulate the transfer of the iron carbide.

10 Claims, 1 Drawing Sheet

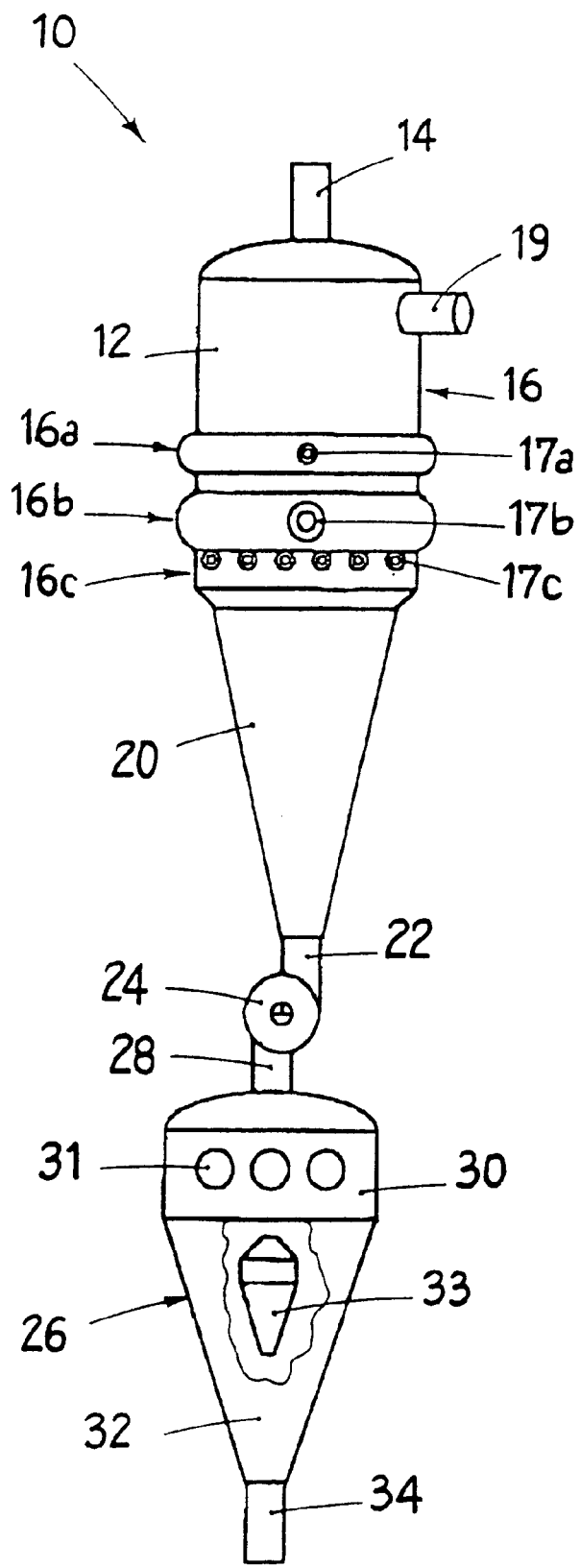

DIRECT REDUCTION DEVICE TO OBTAIN METAL IRON WITH A HIGH CONTENT OF CARBON IN THE FORM OF CARBIDE

FIELD OF THE INVENTION

This invention concerns a direct reduction device to obtain metal iron with a high content of carbon in the form of iron carbide. The device is of, the gravitational type and comprises a reduction and carburation reactor under which a cooling and passivation container is arranged wherein the iron carbide is cooled and completely passivated.

BACKGROUND OF THE INVENTION

Methods for the direct reduction of mineral iron which have been known and developed during the last fifty years require an integrated system with two fundamental units to obtain highly metallized iron.

In the first unit, called the reduction reactor, a reduction gas, generally hydrogen, carbon monoxide or a mixture of the two, is brought into contact, at high temperature, with the mineral iron.

The second unit, called the reformer, is to generate the reducing gas; here, natural gas is made to react with a gas containing oxygen, water vapor and/or carbon dioxide, generating a gas which is rich in hydrogen and carbon monoxide and which is injected into the reduction reactor.

In the last twenty years, auto-catalytic processes have been developed, wherein the metal iron is employed as a catalyser in the reforming reactions, and corresponding methods for the direct reduction of mineral irons, which eliminate the need for separate reaction units and the use of nickel catalysers, and also additional processing units.

More recently, auto-catalytic processes have been orientated towards the production of iron carbide starting from mineral irons in a single reactor, that is, of a single unit in which the steps of reduction, generation of reducing gas, carburation of the metal iron, cooling and passivation of the product all occur.

These devices with a single unit have at least the following two disadvantages however: during cooling and passivation, a column of gas rises towards the carburation zone, so that it is easy to lose control of the carbon and its transformation into iron carbide, given that it is not possible to control the optimum temperature level at which the carbon is diffused and combined; moreover, in order to ensure that the material remains for a suitable time in the carburation zone, it is necessary to increase the height of the column of material inside the reactor, so that the product is subjected to high pressure in the lower zone of the reactor itself, with the danger that the material deteriorates and fine particles are produced.

The present Applicant has devised, designed and perfected the direct reduction device according to the invention to overcome the shortcomings of the state of the art.

SUMMARY OF THE INVENTION

The direct reduction device to obtain iron carbide from oxides containing iron according to the invention is set forth and characterized in the main claim, while the dependent claims describe other innovative aspects of the invention.

One purpose of the invention is to achieve a device wherein the reaction steps, such as the direct reduction of the metal iron oxides and the carburation thereof, the passivation and cooling treatment are physically separate.

In accordance with this purpose the device according to the invention essentially consists in connecting a normal reduction reactor, in which metal iron is produced from mineral iron and consequent carburation, with a controlled atmosphere container to obtain the passivation and cooling of the product.

To be more exact, the device comprises a reduction, carbon deposit and carburation assembly, consisting of a reactor with an inlet from the upper portion for mineral containing iron oxides, a cylindrical reduction zone to reduce the metal iron oxides and to deposit the carbon above the iron, and a carburation zone, wherein the different carbides are formed: $FeC$, $Fe_2C$, $Fe_3C$, preferably $Fe_3C$.

The reactor has a conical zone in the lower portion, where an increase in the hot iron carbide occurs. The conical zone is connected at the lower cart with a container by means of a valve for solids, normally hot.

The reactor also comprises a double injection of the reduction gas in order to effect a better distribution and supply of heat energy and a methane distributor, located just underneath the double injection of the process gas, in order to obtain the carbon deposit. All the gas which is generated in the carbon deposit zone and in the reduction zone rises towards the top of the reactor, that is, towards the inlet of the iron oxide.

The hot iron carbide between about 550° C. and 650° C. is transferred to the cooling container, where it is then passivated and cooled to about 50° C. The material is then discharged by means of a vibrating feed assembly, with a grid or pendulum bar.

BRIEF DESCRIPTION OF THE DRAWING

These and other characteristics of the invention will become clear from the following description of a preferred form of embodiment, given as a non-restrictive example, which shows a diagram of a direct reduction device according to the invention.

DETAILED DESCRIPTION OF PREFERRED EMBODIMENT

With reference to the drawing, a direct reduction device 10 according to the invention to obtain iron carbide starting a from iron oxides comprises a reactor 12 with a reduction zone 16, substantially cylindrical in shape, into which mineral containing iron oxide is fed through an upper inlet conduit 14.

Hot process gas is suitable to be injected into two lower zones 16*a* and 16*b* of the reactor 12 through injectors 17*a* and respectively 17*b*. The process gas can be of any known type, for example that described in the PCT international publication No. WO-A-00/36156.

To distribute the energy better and more efficiently in the reactor 12, the process gas is divided between the injectors 17*a* and 17*b* in a proportion of about 30/70, with a preponderance therefore for the lower injectors 17*b*.

In one zone 16*c*, lower than the zones 16*a* and 16*b*, natural gas, for example methane, is injected into the reactor 12 by means of corresponding injectors 17*c*.

Hot reducing gas is formed in the zones 16*a* and 16*b* due to auto-catalytic reforming, whereas more hot reducing gas is formed in the zone 16*c* due to hot division of the natural gas.

The reactor 12 is provided with an upper outlet conduit 19, through which all the gas introduced is suitable to exit after it has been used.

The reducing gas passes through the material containing iron and iron oxide and deposits carbon thereon, in a sufficiently controlled manner, both by proportioning the injection of the gases and also due to hot division of the natural gas.

Below the zone 16*c* there is a carburation zone 20, into which the material with carbon deposited on its surface passes, due to gravity; from zone 20, the carbon spreads inside and combines with the metal iron to produce the iron carbides in the form of FeC, $Fe_2C$, $Fe_3C$. These are suitable to leave the reactor 12 still hot, that is, at a temperature of about 550–650° C., through a lower conduit 22.

The material remains in the zone 20 for a period, indicatively, of between one and two hours, advantageously an hour and a half; the period, and the outflow of the material, is regulated by a connecting means 24 which can be constituted by a valve for solids (as shown in the drawing) or by a sinple conduit, both located below the conduit 22.

The material, still hot, is transferred through the valve 24 into a cooling and passivation container 26 arranged below the reactor 12.

The container 26 comprises in turn an upper conduit 28, connected to the connecting means 24, a cylindrical zone 30 into which, through conduits 31, cooling and passivation gas is injected, consisting for example of methane to about 60–65%, of $H_2$ to about 20–25%, of CO to about 6–8% and of $CO_2$ to about 6–8%, and preferably containing about 1–3% of water vapor and/or about 1–2% of oxygen.

In the event the connecting means are constituted by the valve for solids 24, the latter has also the function of preventing the cooling gas used in the container 26 from rising towards the reaction zone 20, and separates the reaction zone from the cooling zone, preventing the product underneath from having to support an excessive column above.

The cooling and passivation gas also enters the container 26 through a device 33 located in the conical zone 32, where it is distributed radially to come into contact with the material and create a thin cap of oxide which protects the iron carbide from attacks from the air and/or humidity which has accumulated in the environment.

The iron carbide is discharged by means of a lower discharge device 34 such as a vibrating feeder, a grid or a pendulum bar, of any type known to the state of the art and not shown in the drawing in detail. The device 34 is synchronised with the solids valve 24, so that the quantity of material inside the container 26 remains substantially constant.

In the event the connecting means 24 are constituted by a conduit which connects the conduit 22 with the conduit 28, the control of the flow of the material which passes from the reactor 12 to the container 26 is performed directly by the a lower discharge device 34.

It is obvious that modifications or additions may be made to the device 10 as described heretofore, but these shall remain within the field and scope of the invention.

It is also obvious that, although this invention has been described with reference to a specific example, a person of skill in the art shall certainly be able to achieve many other equivalent forms thereof, all of which shall remain within the field and scope of the invention.

What is claimed is:

1. A gravitational direct reduction device to obtain iron starting from iron oxide, comprising:

a reduction and carburation reactor wherein the iron oxide is suitable to be reduced to metal iron and to be then transformed into iron carbide in any one of its forms or into a mixture of these forms, wherein below said reactor a cooling and passivation container is arranged for cooling and passivating said iron carbide, and wherein connecting means are interposed between said reactor and said container to regulate the transfer of the hot iron carbide from said reactor to said container; and wherein said cooling and passivation container comprises a cylindrical zone and at least a diffusion device arranged below said cylindrical zone and able to diffuse a cooling gas to cool the product, through direct contact, in the segment between said cylindrical zone and said diffusion device, from about 550–650° C. to about 90° C.

2. A direct reduction device as in claim 1, wherein said connecting means comprises a valve for solids.

3. A direct reduction device as in claim 1, wherein a discharge device to discharge the cold product is associated with the lower portion of said container and is synchronised with said connecting means.

4. A direct reduction device as in claim 1, wherein said connecting means are constituted by a conduit which connects said reactor to said cooling and passivation container, and wherein the control of the flow of the material which passes from said reactor to said cooling and passivation container is performed directly by said discharge device.

5. A direct reduction device as in claim 1, wherein said reactor is provided with at least two reduction gas inlets, in order to improve the distribution of the gas and energy inside.

6. A direct reduction device as in claim 1, wherein said reactor comprises a reduction zone, and wherein introducing means to introduce natural gas are provided immediately below said reduction zone of said reactor in order to improve the flow of heat onto the reduced iron and to achieve a deposit of carbon on the surface of the metal and also to allow the uniform control of said deposit.

7. A direct reduction device as in claim 1, wherein said reactor comprises a sufficiently large conical zone in which the material is able to remain for a time of between one and two hours at a temperature of between 550° C. and 650° C., whereby the carbon deposited in the zone where the natural gas is injected can spread and combine with the metal iron to form said iron carbides.

8. The direct reduction device as in claim 1, wherein said cooling and passivation container also comprises a discharge device arranged below said diffusion device at a distance sufficient to allow the iron carbide to cool further, to about 50° C., before exiting from said container.

9. A gravitational direct reduction device to obtain iron carbide starting from iron oxide, comprising:

a reduction and carburation reactor wherein the iron oxide is suitable to be reduced to metal iron and to be then transformed into iron carbide in any one of its forms or into a mixture of these forms, wherein below said reactor a cooling and passivation container is arranged for cooling and passivating said iron carbide, and wherein connecting means are interposed between said reactor and said container to regulate the transfer of the hot iron carbide from said reactor to said container;

wherein said cooling and passivation container comprises a cylindrical zone and at least a diffusion device arranged below said cylindrical zone and able to diffuse a cooling gas to cool the product, through direct contact, in the segment between said cylindrical zone and said diffusion device, from about 550–650° C. to about 90° C.; and wherein said cooling gas contains at least about 1–3% of water vapor and/or 1–2% of oxygen suitable to create a thin cap of oxide above the material, passivating it completely.

10. The direct reduction device as in claim 1, wherein said connecting means are suitable both to transfer the carburated material to said cooling and passivation container, and also to maintain said conical zone free from said cooling gas.

* * * * *